V. KOSENKO.
AUTOMATIC BEET PULLER.
APPLICATION FILED MAR. 5, 1920.

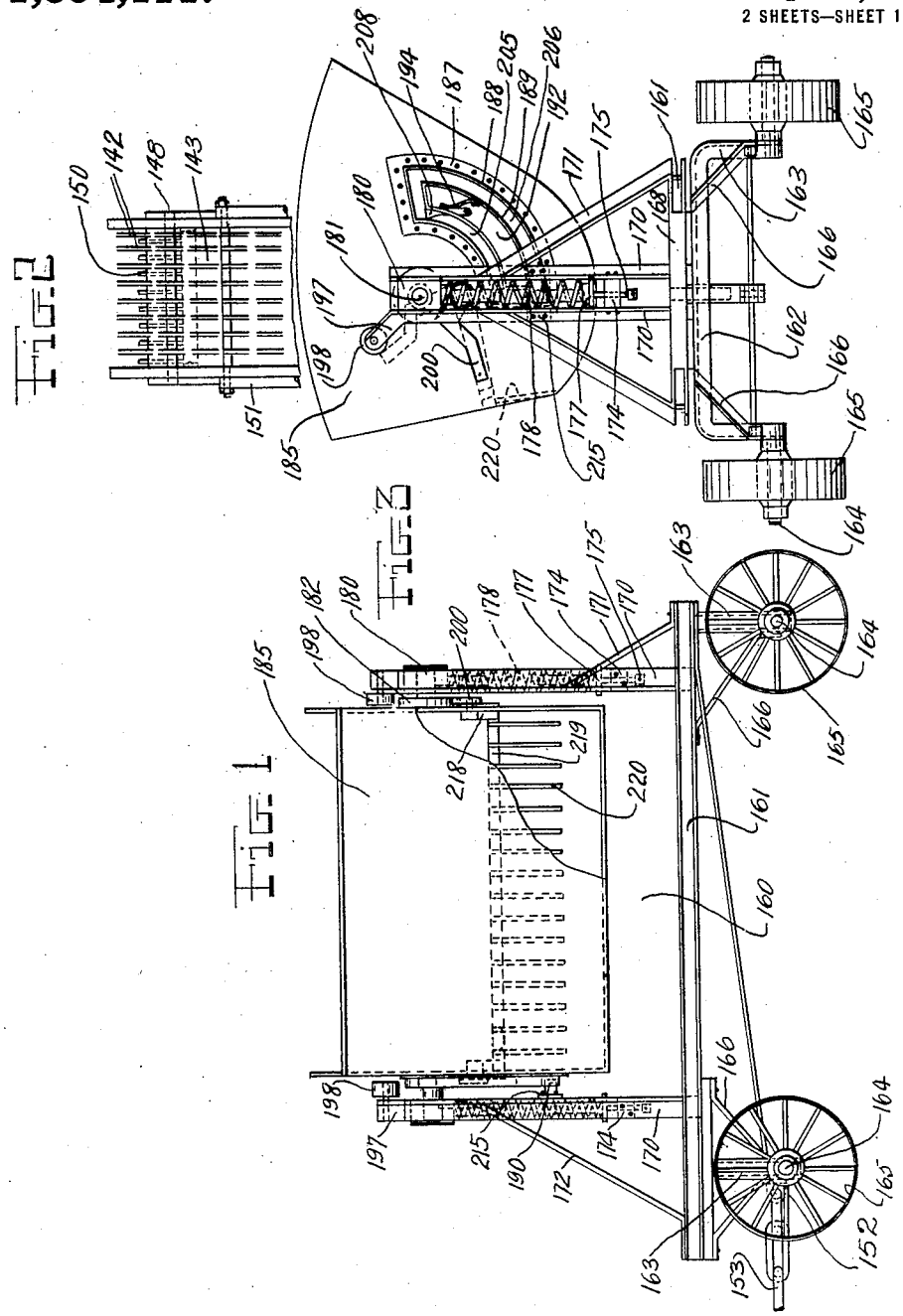

1,354,111.

Patented Sept. 28, 1920.
2 SHEETS—SHEET 2.

INVENTOR
Vasily Kosenko
BY
Frank Ledermann
ATTORNEY

UNITED STATES PATENT OFFICE.

VASILY KOSENKO, OF NEW BRUNSWICK, NEW JERSEY.

AUTOMATIC BEET-PULLER.

1,354,111.  Specification of Letters Patent.  Patented Sept. 28, 1920.

Original application filed April 17, 1919, Serial No. 290,662. Divided and this application filed March 5, 1920. Serial No. 363,596.

*To all whom it may concern:*

Be it known that I, VASILY KOSENKO, a citizen of Russia, residing at New Brunswick, county of Middlesex, and State of New Jersey, have invented certain new and useful Improvements in Automatic Beet-Pullers, of which the following is a specification.

This invention relates to improvements in trailers adapted for use with my machine for harvesting beets described in my copending application filed April 17, 1919, Serial No. 290,662 of which case this is a division.

It is the object of the invention to provide a trailer into which the beets after the removal of their leaves are delivered and after they have been cleaned from the adhering soil.

A further object is to provide a trailer having a pivoted receptacle and provided with automatically operated means for dumping its contents as it becomes filled.

These and other like objects, which will become more fully manifest as the description progresses, are attained by the novel construction and combination of parts hereinafter described and shown in the accompanying drawings, forming a material part of this disclosure and in which—

Figure 1 is a side elevational view of the trailer.

Fig. 2 is a fragmentary end view of a conveyer.

Fig. 3 is a rear end view of the trailer.

Figure 4:
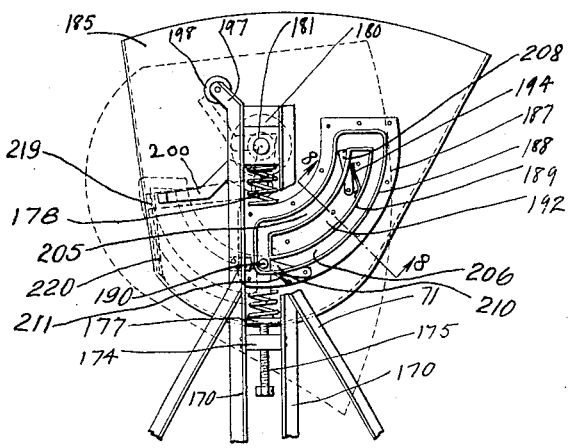
Fig. 4 is a fragmentary view of the same, showing in broken lines the receiver when in a position to unload the vegetables.
Figure 5:
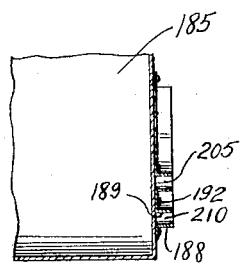
Fig. 5 is a fragmentary transverse view taken on line 8—8 of Fig. 4.

Engageable with a beet harvester by means of eyes 152 and links 153, is a trailer 160, the same being comprised of a pair of parallel channel shaped rails 161, resting upon U-shaped axles 162, their downwardly extending elements 163 carrying spindles 164, upon which the support wheels 165 are mounted, the U shaped axle being further supported by diagonally disposed braces 166, as best shown in Figs. 1 and 3.

Rising from the platform 168 and extending over the rails 161, centrally at the front and rear, are pairs of opposed vertical angles constituting posts 170 held in upright relation by means of diagonally disposed braces 171 and 172, respectively at the rear and front, so that the posts 170 are maintained rigidly vertical.

Fixed between the pairs of posts, near the lower ends are rigid blocks 174, through which pass adjusting screws 175, the points of the screws contacting with sliding elements 177, against which the lower ends of coiled compression springs 178 make contact, the upper ends of the springs abutting against slidable bearings 180, carried between the posts at their upper ends, and in which are rotatably mounted short spindles 181, the inner ends of which are engaged with plates 182, secured upon the opposite ends of a segmental shaped container 185.

Fixed upon the side of the container 185 is an arcuate plate 187, having outstanding flanged elements, respectively 188 and 189, forming channels 205 and 206 joined at their ends and engageable with a roller 190 rotatable on a pin extending inward from a cross strip 215 attached to the front posts 170, this roller being guided in the channels between the upstanding flanges 188 and 189.

Extending into the recess 205 at its upper end is a finger 208 pressed outward by a spring 194, a similar finger 210 being pivoted at the bottom of the recess 205, impelled by the spring 211.

Thus as the receptacle 185 becomes filled, the accumulating weight depresses the springs 178, and as the pivotal point 181 of the receptacle is to one side of its center, the same is caused to tilt, the roller 190 moving in the recess 205, and passing the finger 208 is prevented from returning.

The contents of the receptacle being automatically unloaded, the springs 178 exert a raising effect, causing the roller to continue in the cross recess and travel in the recess 206, passing the finger 210 and holding the receptacle stationary in a vertical position.

Arms 197, extending diagonally from one of the pair of posts 170, carry rollers 198, and contactable with the rollers are angular cam arms 200 fixed upon the sides of the container 185, these cam arms having inwardly extending elements 218, between which is a fixed longitudinally extending bar 219, in which are secured a plurality of comb-like teeth 220, adapted, when the receptacle 185 is turned upon its axis, to act in the manner of a fork, removing any of the vegetables resting therein without manual labor.

The forks are actuated upon the depression of the receptacle, and limited by the contact of the cams with the rollers 198; thus the receptacle 185 is automatically emptied of its contents when it becomes filled to its capacity, the vegetables being dumped in bulk at intervals along the path of the implement.

From the foregoing it will be seen that the apparatus is capable of being adjusted so as to receive the vegetables cleaned of any adhering soil and leaves, and which is provided with automatic means for dumping its contents as it becomes filled, all of the several operations being performed without manual labor and in an effective manner.

Having thus described my invention what I claim as new and desire to secure by Letters Patent of the United States is as follows:

1. The combination with a beet harvester, of a trailer engageable with said harvester, pairs of posts arranged centrally at each end of said trailer, a receptacle journaled between said posts, the journals of said receptacle moving vertically therebetween, resilient means for holding said receptacle in a normally raised position, said receptacle being pivoted at one side of the center, means permitting said receptacle to oscillate upon its axis, means for limiting said oscillating movement, and means for returning said receptacle to its normal position after the discharge therefrom.

2. The combination with a beet harvester, of a trailer engageable therewith, an open topped receptacle pivotally mounted in said trailer laterally of its center, arcuate channels on the sides of said receptacle, a pin engageable in said channels, means for preventing a reverse movement of said pin therein, and means when said said receptacle is rotated upon its axis for scraping the interior thereof.

3. A trailer adapted to be used in connection with a beet harvester, comprising in combination, a wheeled platform, a pair of vertical standards thereon, bearings mounted to slide in said standards, resilient means for maintaining said bearings in a normally raised position, arcuate elements secured upon the sides of said receptacle, said arcuate elements containing recessed channels, rollers secured in said standards engageable in said channels, means preventing the reverse movement of said receptacle until said rollers have made a complete circuit in said channels, arms extending diagonally from the tops of one of each pair of said standards, rollers in said arms, cams pivotally secured at the sides of said receptacle engageable with said rollers, a bar longitudinally arranged in said receptacle, and a plurality of forks secured to said bar adapted to clear the interior of said receptacle when it is rotated.

In testimony whereof I have affixed my signature.

VASILY KOSENKO.